United States Patent
Wapner

[11] 3,778,596
[45] Dec. 11, 1973

[54] AUTOMATIC BANKING DEPOSIT MACHINE

[75] Inventor: Joseph S. Wapner, Levittown, Pa.

[73] Assignee: Metalogics Corporation, Chicago, Ill.

[22] Filed: Sept. 20, 1971

[21] Appl. No.: 181,882

[52] U.S. Cl........ 235/61.9 R, 229/70, 235/61.12 R
[51] Int. Cl. .......................................... G06k 17/00
[58] Field of Search................ 49/35; 232/4 R, 4 D; 235/61.9 R, 61.7 R, 61.11 E, 12 R, 12 D, 61.11 D; 194/4; 340/146.3 R; 229/70

[56] References Cited
UNITED STATES PATENTS

| | | | |
|---|---|---|---|
| 791,362 | 5/1905 | Parmenter | 229/70 |
| 893,202 | 7/1908 | Shaw | 229/70 |
| 3,104,314 | 9/1963 | Simjian | 340/146.3 R |
| 3,487,905 | 1/1970 | James, Sr. | 235/61.9 R |
| 2,675,170 | 4/1954 | Sebesta | 235/61.12 R |
| 3,538,311 | 11/1970 | Weidmann | 235/61.11 D |

*Primary Examiner*—Thomas A. Robinson
*Attorney*—Michael Ebert

[57] ABSTRACT

An automatic banking deposit machine adapted to accept a deposit pack constituted by an envelope containing the items to be deposited and a deposit-slip assembly adhered to the face of the envelope and including an original slip on which the items to be deposited are entered, and a duplicate slip separable from the pack. When the pack is placed on the machine, the filled envelope and the original deposit slip adhered thereto are separated from the duplicate slip and fed into a locked vault, whereas the duplicate slip is stamped with receipt data and returned to the depositor.

13 Claims, 7 Drawing Figures

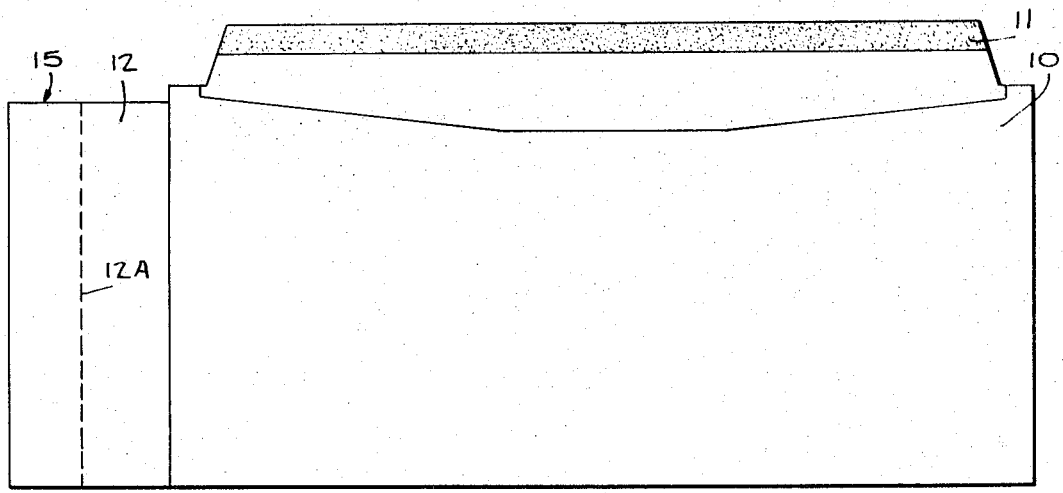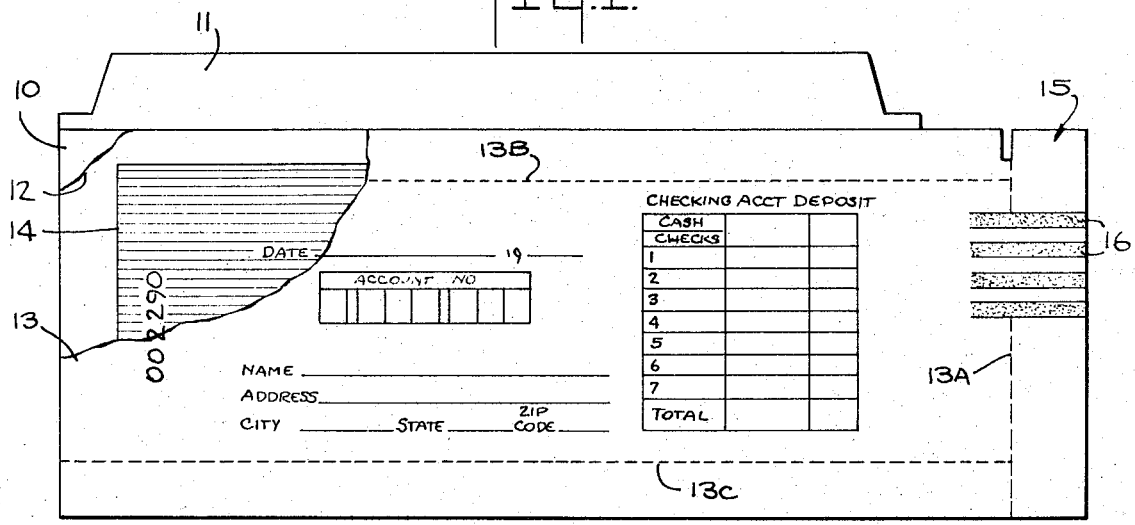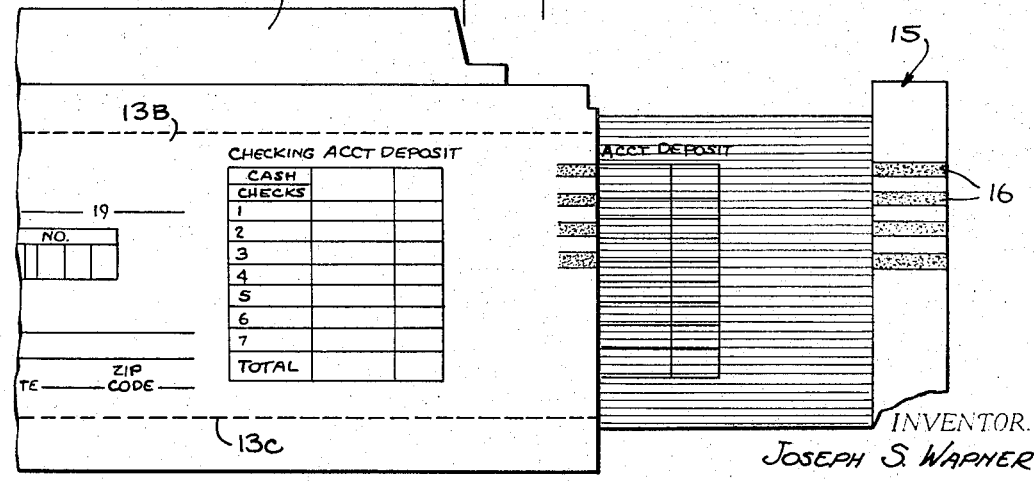

INVENTOR.
JOSEPH S. WAPNER
BY
ATTORNEY

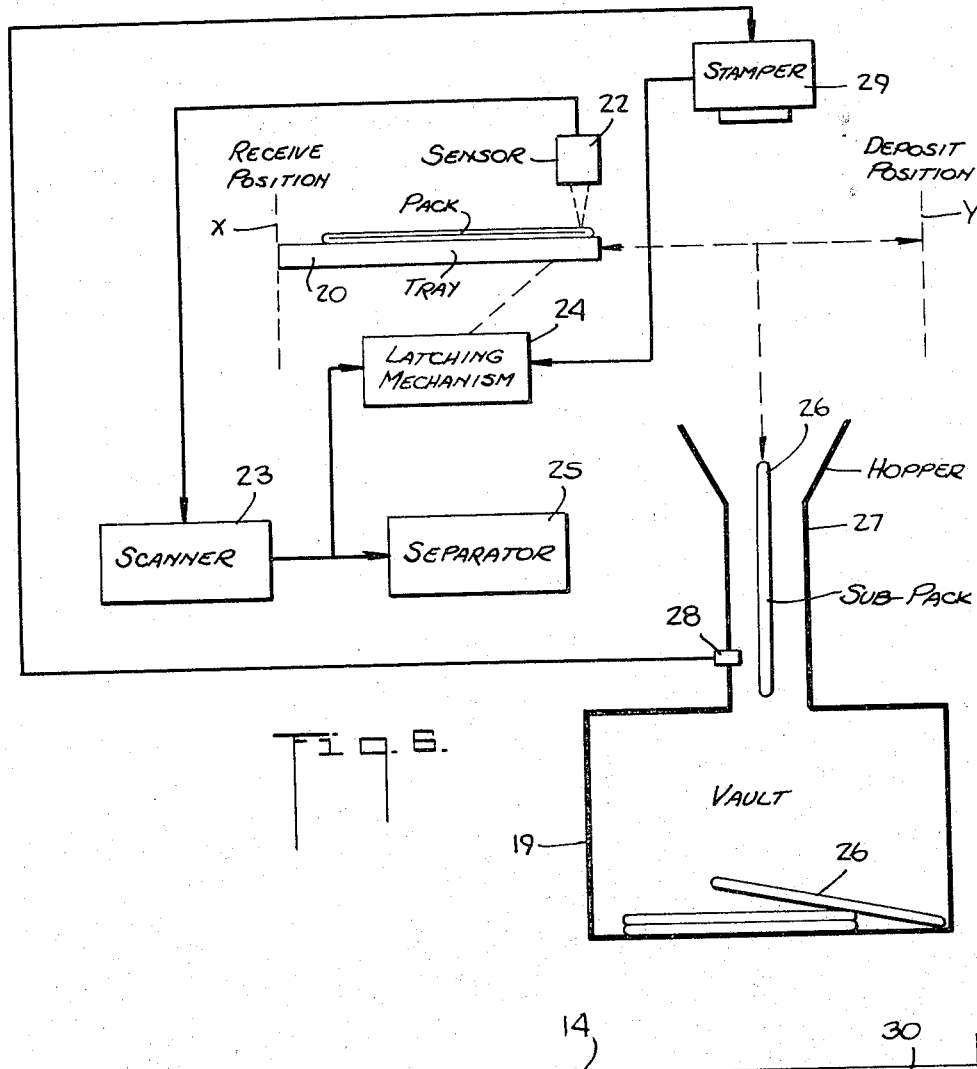

AUTOMATIC BANKING DEPOSIT MACHINE

BACKGROUND OF THE INVENTION

This invention relates generally to banking operations, and more particularly to a banking machine adapted to receive deposits and to issue a receipt therefor without the need for a teller.

The cost of operating a commercial or savings bank is determined in good measure by personnel requirements, for in addition to the bank manager and other executives, the need to receive, record and audit deposits and to pay out funds held by depositors in their accounts entails a relatively large staff of tellers, bookkeepers and other personnel whose functions are mainly clerical in nature. In recent years, significant economies have been effected by computerized behind-scene operations to maintain and audit records, but the introduction of computers has not materially reduced the front-end requirements of a bank, which mainly entail receiving and paying operations.

Thus the typical bank is staffed with tellers whose function is to receive deposits made by clients holding checking or savings accounts and to pay out funds. The present banking practice for making a deposit is for the depositor to first fill out and date a duplicate copy deposit slip on which the depositor is identified by his account number as well as his name and address. The depositor is required to list on the slip the various cash and check items to be deposited.

Upon completion of the deposit slip the client approaches the window of a teller and waits his turn to have his deposit entered. The teller receiving the deposit from the client checks the items listed and after initialling the deposit slip, tears off the duplicate copy which he returns to the client as a receipt, the original slip and the items deposited being retained by the teller. This transaction is usually carried out quickly. Any delay experienced by the depositor is due to waiting time to be served by the teller.

The major difficulty with existing teller operations is by reason of the fact that the volume of business is not uniformly distributed throughout the banking day, but tends to peak at certain periods. Thus the bank's facilities may be overtaxed during the noonday period or shortly before closing time, whereas at other intervals banking traffic may be relatively light.

In order to avoid long lines at the teller windows with its resultant inconvenience to the clients, the well-run bank must employ a large staff of tellers capable of handling the peak periods. While these tellers are busily employed at certain times, there are other stretches in the course of a working day when they may have little to do. But the uneven load imposed on the teller staff does not lighten the cost of maintaining the staff, for whether or not full use is made of a teller, he must be paid.

While various automatic machines have heretofore been proposed to relieve the need for personnel to receive deposits, such machines have been relatively complex and unreliable as well as difficult to operate. Moreover, in many instances, they impose a greater responsibility on the depositor, who is called upon to do more than fill out a single deposit slip and place the deposit on the counter of the teller.

SUMMARY OF THE INVENTION

In view of the foregoing, it is the main object of this invention to provide a banking machine capable of receiving deposits made by clients of the bank and to issue receipts therefor, thereby reducing the front-end personnel requirements of a bank.

More specifically, it is an object of the invention to provide a machine of the above type which is adapted to receive a deposit pack consisting of an envelope containing the items to be deposited and a duplicated deposit slip assembly listing the items, which machine first verifies the pack to be sure that it is acceptable and if so, separates the envelope and the original deposit slip from the duplicate slip, the envelope and the original slip being deposited in a locked vault, the duplicate being stamped with appropriate date and returned to the depositor as a receipt.

A significant advantage of the invention is that it relieves the bank of the need for teller personnel to carry out routine deposit operations without, however, shifting greater responsibilities onto the client, for the client's role is unchanged in that he does no more than list the items to be deposited in the usual fashion. Another advantageous factor is that the depositor who uses the machine seals the items to be deposited in an envelope, so that the possibility of misplaced or lost items arising with the present practice, in which the items are presented in loose form to the teller, is obviated.

Also an object of the invention is to provide an automatic bank deposit machine which may be used without the slightest difficulty by any depositor, and whose operation is efficient and reliable.

Still another object of the invention is to provide a low-cost automatic bank deposit machine which expedites banking operations and effects significant economies in operating costs.

Briefly stated, these objects are attained in an automatic bank deposit machine adapted to accept a deposit pack constituted by a standard sealable envelope for containing the items to be deposited, and a deposit-slip assembly adhered to the face of the envelope and including an original slip onto which the client's account number and the items to be deposited may be entered, and a duplicate slip which is separable from the assembly by means of a pull tab, the original slip bearing verification data.

The machine includes a slidable tray for receiving from the depositor a pack, face up. When pushed in by the depositor, the tray shifts from the receiving position to a discharge position in which the pack is out of the depositor's reach. In the course of tray movement, the verification data is sensed to produce a latching signal only if the pack is acceptable, the latching signal serving to hold the tray at its discharge position. If no latching signal is generated, the tray is immediately returned to the receiving position, thereby rejecting the pack.

When the tray is latched, the machine then carries out the following functions:

First, the pull tab is gripped to hold the duplicate slip in the tray while the envelope and the original slip attached thereto are separated from the duplicate slip and discharged as a sub-pack into a hopper leading to a locked vault. The passage of the sub-pack through the hopper is sensed to produce a control signal actuating a stamper mechanism which then applies to the duplicate slip in the tray, receipt data, such as the time and date of the deposit. Upon the conclusion of the stamping operation, the latched tray is released, the tray returning to the receiving position, thereby presenting the receipted duplicate slip to the depositor who removes the slip, thereby completing the transaction.

For a better understanding of the invention, as well as other objects and further features thereof, reference is made to the following detailed description to be read in conjunction with the accompanying drawings, in which:

FIG. 1 is a rear view of a deposit pack in accordance with the invention;

FIG. 2 is a front view of the deposit pack;

FIG. 3 is a front view of the deposit pack with the duplicate slip in the act of being separated therefrom;

FIG. 6 is a block diagram of the operating system of the automatic banking deposit machine; and FIG. 7 illustrates the receipted deposit slip yielded by the machine after accepting a deposit.

DESCRIPTION OF THE INVENTION

Figure 4:
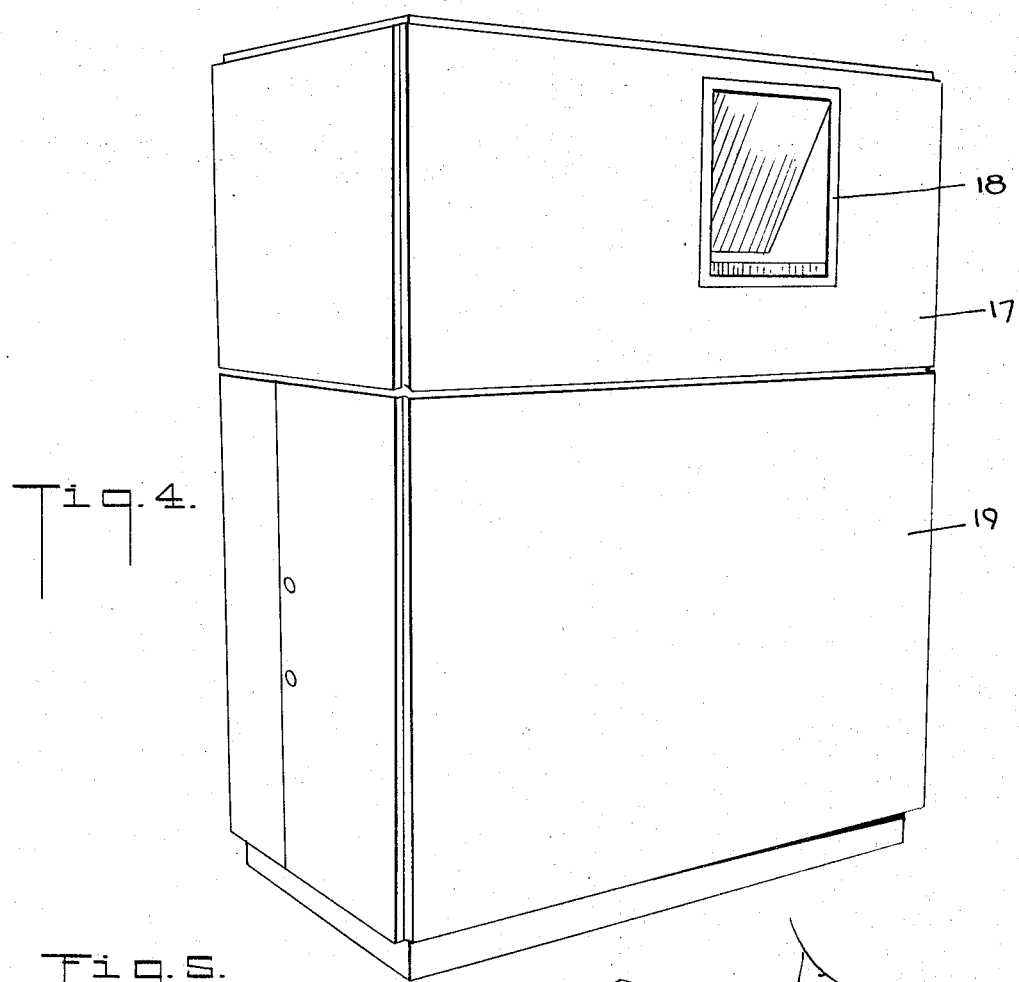
FIG. 4 shows an automatic banking deposit machine in accordance with the invention, which machine is adapted to receive deposit packs of the type shown in FIG. 1.

Referring now to the drawings, and more particularly to FIGS. 1 to 3, there is shown a deposit pack designed to be processed by an automatic banking machine in accordance with the invention. The deposit pack is constituted by a standard envelope (i.e., 8″ × 4″) designated by numeral 10, and including a closure flap 11 having a band of adhesive thereon.

Secured to envelope 10 is a deposit-slip assembly formed by a blank base sheet 12 which is adhered to the front face of the envelope and top sheet 13 whose upper and lower longitudinal margins are pasted to base sheet 12 to define a pocket or channel therebetween. Top sheet 13 is printed to form an original deposit slip to be filled out by the depositor. Base sheet 12 and top sheet 13 are of the same dimensions.

Interposed between the top sheet and base sheet within the pocket formed thereby is a narrower duplicate deposit slip 14. The outer end of the duplicate slip is secured to a separable tab 15 formed by a pair of end strips defined by transverse perforations 12A and 13A on the base and top sheets. The outer end of duplicate deposit slip 14 is adhered to and sandwiched between the end strips forming tab 15, so that by pulling the tab relative to the pack, the deposit slip may be withdrawn from its pocket, as shown in FIG. 3.

As will be seen in FIGS. 2 and 3, both the original deposit slip and the duplicate slip contain the usual information required of depositors, such as his account number, his name and address and columns for entering the various items being deposited.

The rear surface of original slip 13 is coated with a pressure-sensitive reproducing or carbon surface, so that when entries are made on the original, they are reproduced on the duplicate slip. The original slip also includes longitudinal lines of perforations 13B and 13C, so that after a deposit is made and the items are removed from the envelope, the original slip may be detached from the envelope and retained for record purposes by the bank, and the empty envelope then discarded.

Printed laterally along the tab side of the pack is a series of bars 16 which overlap the original deposit slip. These bars constitute verification data which is sensed in the banking machine to be sure that the pack deposited therein is acceptable to the machine, the pack otherwise being rejected.

Figure 5:
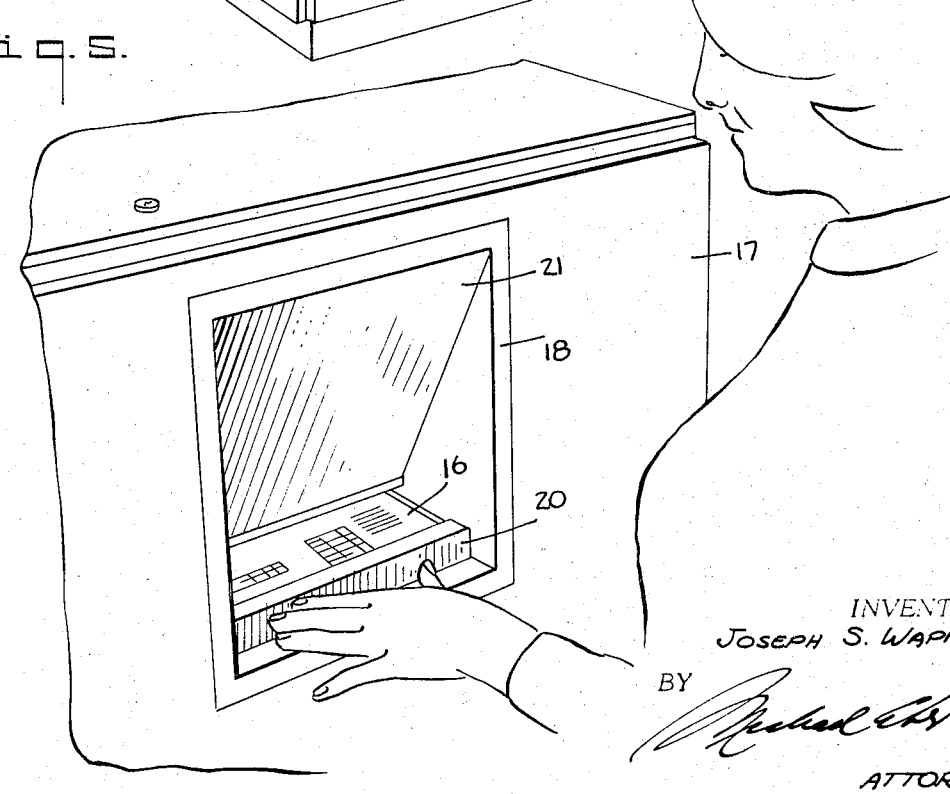
FIG. 5 is an enlarged view of the receiving tray included in the machine.

Referring now to FIGS. 4 and 5, there is shown a banking machine having an upper or processing section 17 provided with a window 18, and a lower or locked vault section 19. Window 18 affords access to a slidable tray 20 adapted to receive a deposit-slip pack—face up, with the verification bars thereon. The tray is manually shiftable by the depositor from a "receive" position, as shown, in which one is able to lay the deposit pack on the tray, to an inner "deposit" position in which access to the deposit pack on the tray 20 is blocked by an inclined shield 21. In practice, operation of the tray may be motorized so that by pressing a button activating a motor, the tray is shifted from the "receive" to the "deposit" position.

The manner in which the machine operates will now be explained in connection with FIG. 6. The depositor first fills out the deposit slip on the pack of the type shown in FIGS. 1 to 3, and inserts and seals the items to be deposited in envelope 10. He then lays the loaded deposit slip pack on the tray 20 of the banking machine, face-up with the verification bars thereon exposed.

Once the deposit pack is in place, the depositor then pushes tray 20 inwardly from its initial or "receive" position to the "deposit" position Y, in which the pack on the tray is out of the depositor's reach. In the course of movement from position X to position Y, the verification bars are optically, magnetically or otherwise scanned by a sensor 22 coupled to an electronic scanner 23, which produce an output signal only when the number of bars scanned is in accordance with a predetermined value. In one practical embodiment, the bars are optically scanned by a photoelectric sensor which produces a pulse for each bar, the pulses being counted in the scanner.

For example, assuming that a given automatic machine installation is intended only to receive deposits for commerical accounts and not savings accounts in a particular branch of the bank, then the scanner may be set to provide an output signal only if eight bars are counted, the number "8" being indicative of the role assigned to this machine. If a pack is placed on the tray having verification data in the form of six bars or nine bars, indicative of savings accounts or other bank branches relating to machines other than the one being operated, then no control signal will be produced by the scanner, and the pack rejected.

It is to be understood that while a simple bar series has been disclosed for verification purposes, any other type of coding may be used, such as those involving character recognition rather than an elementary counting operation.

When scanner 23 produces a control signal, it activates a latching mechanism 24 which temporarily holds the scanner tray at deposit position Y. The control signal is also supplied to activate a separator 25 which, at the latching position of the tray, engages the tab on the pack while pulling the envelope, thereby separating the duplicate deposit slip from the remainder of the pack. The remainder of the pack is hereinafter identified as the sub-pack 26, which consists of envelope 10, base sheet 12, and original deposit slip 13, as well as the items enclosed in the envelope.

Sub-pack 26 is dropped by the separator 25 down a chute 27, the passage thereof being sensed by a suitable mechanical or optical sensor 28 which produces a signal activating a stamper 29. The sub-pack is conveyed by the chute to locked vault 19. The duplicate slip 14, which still lies in the tray at the deposit position, is then stamped by stamper 29 with receipt information, such as information 30 shown adjacent tab 15. This information gives the time of deposit, the machine serial number, and branch identification and any other pertinent data appropriate for receipt purposes.

The stamper operation is coordinated with the operation of the latching mechanism 24, and when the stamper 29 retracts, it sends a signal to latching mechanism 24 to release tray 20 and cause it to return to its initial "receive" position X.

At the "receive" position, the receipted duplicate slip 14 is then withdrawn by the depositor as his record of the deposit. At the end of the banking day, all sub-packs 26 may be taken by an official from the locked vault and the deposited items checked and entered in the usual manner.

Thus the machine relieves the bank of the need to provide tellers for directly receiving deposits. As many machines may be installed as are necessary to satisfy the traffic requirements at peak periods, so that at no time in the course of the banking day are depositors required to wait in line for more than a brief period. Also, machines of the type disclosed herein may be used in conjunction with a night deposit access door, but instead of dropping a deposit bag into a vault through the door, one may make a deposit on the slidable tray and obtain an immediate receipt thereof, an advantage lacking with existing night deposit systems in which receipts must be mailed back to the depositor.

While there has been shown and described a preferred embodiment of an automatic banking deposit machine in accordance with the invention, it will be appreciated that many changes and modifications may be made therein without, however, departing from the essential spirit of the invention.

I claim:

1. In an automatic banking system,
    A. a deposit pack constituted by a sealable envelope and a deposit-slip assembly attached thereto, said assembly including original and duplicate deposit slips onto which deposit items placed within said envelope are entered, said duplicate slip being separable from said assembly, and
    B. a machine for receiving a deposit pack loaded with items to be deposited and including means to separate said duplicate slip from the assembly thereby to provide a sub-pack consisting of the loaded envelope and the original deposit slip, means to convey the sub-pack into a locked vault, and means to apply receipt data on the separated duplicate slip and to return it to the depositor.

2. In a system as set forth in claim 1, wherein said duplicate slip is provided with an end tab which is engageable by the separating means of the machine.

3. In a system as set forth in claim 1, wherein said original slip is perforated to facilitate its separation from the sub-pack, whereby the original slip may be retained by the bank and the empty envelope discarded after the items are removed therefrom.

4. In an automatic banking system as set forth in claim 1, wherein said pack is provided with verification data, and said machine is provided with a sensor to scan said data in the course of receiving the pack to determine whether the pack is acceptable for deposit, the pack otherwise being rejected.

5. In a system as set forth in claim 4, wherein said verification data is in the form of a series of bars printed on the original deposit slip.

6. In a system as set forth in claim 4, wherein said machine includes a tray adapted to receive said pack and slidable from a receive position to a deposit position inaccessible to the depositor, said machine further including means to latch said tray at said deposit position only if the pack is verified as acceptable.

7. In a system as set forth in claim 6, wherein said duplicate slip remains on said tray after separation from the sub-pack and is returned in receipted condition to said depositor.

8. In a system as set forth in claim 7, wherein said duplicate slip on said tray is stamped with receipt data by a stamper which when it completes its operation, releases said latch means.

9. In a system as set forth in claim 8, further including means to sense the passing said sub-pack into said vault to produce a signal for activating said stamper.

10. A deposit pack for use in an automatic banking machine, said pack comprising:
    A. a sealable envelope for receiving checks and other items to be deposited, and
    B. a deposit-slip assembly attached to the face of said envelope, said assembly being constituted by a base sheet adhered to the face of the envelope, a top sheet marginally secured to the edges of the base sheet to define a pocket having an open end, said top sheet forming an original slip onto which deposit items placed within said envelope are entered, and an underlying duplicate slip onto which said entries are recorded, said duplicate slip being inserted in said pocket and being separable therefrom in the endwise direction for further processing in said banking machine.

11. A deposit pack as set forth in claim 10, wherein said duplicate slip is provided with an end tab to facilitate the separation thereof.

12. A deposit pack as set forth in claim 10, wherein said original slip bears verification data in a form which may be sensed by said machine.

13. A deposit pack as set forth in claim 11, wherein said end tab is formed by a pair of end strips defined by transverse perforation lines at corresponding positions along said base and top sheets, the outer end of the duplicate slip being adhered to and sandwiched between said end strips to create said tab, so that by pulling the tab in the endwise direction relative to the pack to tear said lines, the duplicate slip can be withdrawn from its pocket.

* * * * *